April 25, 1939.     J. P. SMITH, JR     2,156,199
ELECTRICAL INDICATOR
Filed Aug. 28, 1937
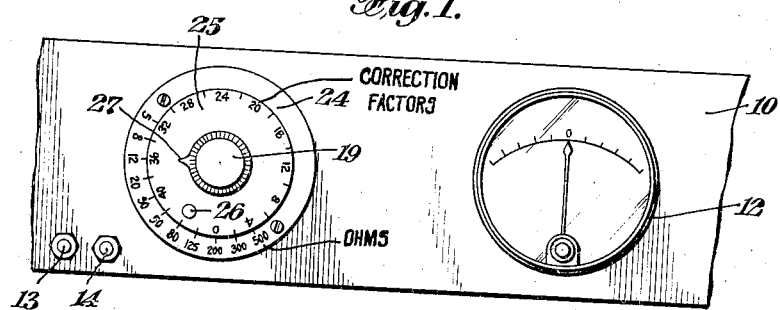
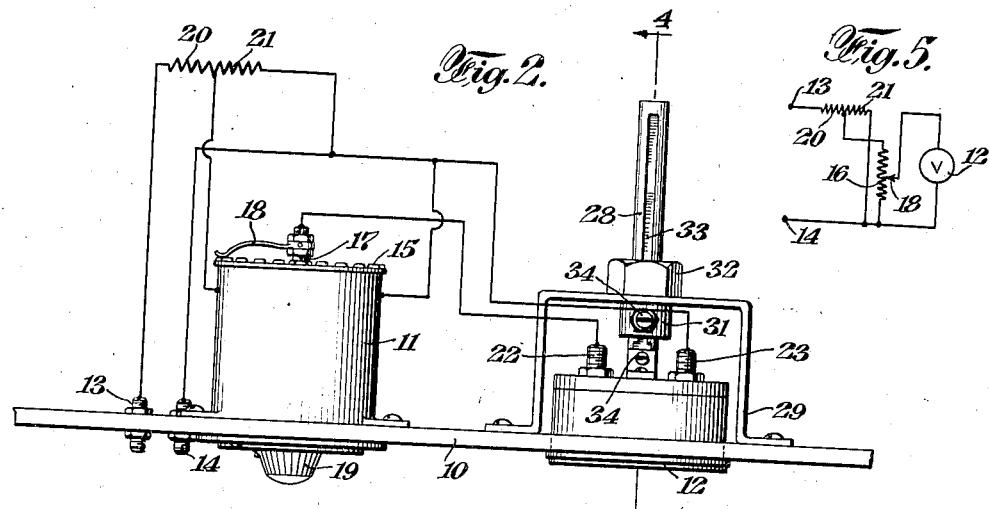
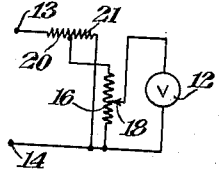
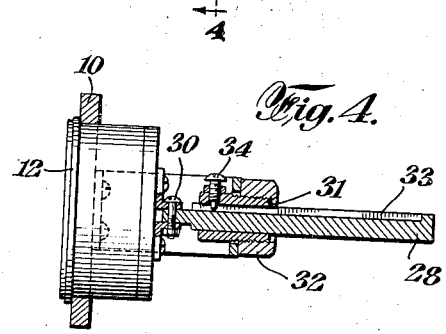
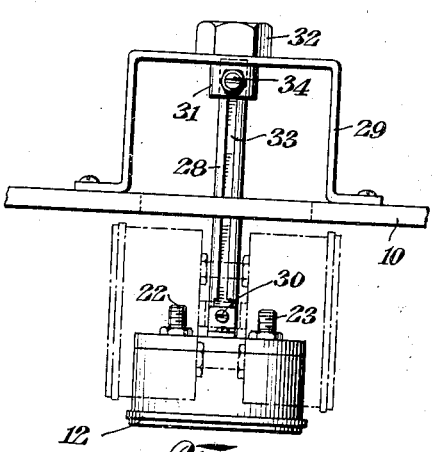
John P. Smith Jr.
INVENTOR
BY Kenyon & Kenyon
ATTORNEYS Patented Apr. 25, 1939

2,156,199

UNITED STATES PATENT OFFICE 2,156,199

ELECTRICAL INDICATOR

John P. Smith, Jr., Ridgewood, N. J., assignor to The Daven Company, Newark, N. J., a corporation of New Jersey Application August 28, 1937, Serial No. 161,501

4 Claims. (Cl. 171—95)

This invention relates to electrical indicators and more especially to an electrical instrument which will provide a visual indication of the instantaneous voltage or energy conditions existing in alternating current circuits or networks, particularly those applying to such fields as communication, broadcasting, public address and sound recording and reproducing systems of all types. In general, the requirements for such instruments are high efficiency, linear response characteristic for all frequencies in the audio range, linear reaction to the circuit under measurement, distortionless reaction to such measurement and wide range of indication to permit measurements from low to high levels.

In existing indicators of this type, there is an inherent tendency to distort the wave form in the circuit under measurement for practically all instruments using an attenuator in combination with an A. C. volt meter and is particularly noticeable in circuits operating at low levels. The magnitude of this distortion is often as much as 2% and may be aggravated to some extent by a varying output impedance. Also, in such indicators, a corrective factor has to be taken into account by the operator upon use of the indicator with different impedance circuits. Usually the volt meter in such circuits is housed in a cabinet or panel in such manner that the range of vision of the dial is very slight.

An object of this invention is an inexpensive and accurate indicator in which wave form distortion is negligible and the input impedance is substantially constant and which is provided with means adapting it for use with different impedance circuits and in which the meter is so mounted as to have a high range of vision and substantially to eliminate parallax.

Other objects, novel features and advantages of this invention will become apparent from the following specification and accompanying drawing, wherein:

Fig. 1 is a front elevation of the panel of an indicator embodying the invention;

Fig. 2 is a plan view of Fig. 1, together with a wiring diagram;

Fig. 3 is a fragmentary view similar to Fig. 2 showing the meter in a different position from Fig. 2;

Fig. 4 is a section on the line 4—4 of Fig. 2, and

Fig. 5 is a circuit diagram.

In the panel 10 are mounted a potentiometer 11 and an A. C. volt meter 12, preferably a 5000 ohm copper oxide rectifier type and binding posts 13 and 14 are likewise supported by the panel. The potentiometer is provided with a series of contacts 15 suitably tapped to a resistance winding 16 contained within the casing of the potentiometer. A shaft 17 extends centrally through the potentiometer and carries a contact 18 which is adapted to engage the various contacts 15, the shaft 17 being provided with an operating button 19. The binding posts 13 and 14 are connected in circuit with the series arranged resistances 20 and 21. One end of the resistance winding 16 of the potentiometer is connected to the last-named circuit between the resistances 20 and 21, and the other of said winding is connected to the binding post 14. The movable contact 18 is connected to the binding post 22 of the meter 11 while the binding post 23 of the meter is connected to the binding post 14. The resistances 20 and 21 form the series and shunt arms of a fixed L attenuator and are of such size that the attenuator is of 5000 ohm output impedance. The loss of this attenuator is ten decibels and is compensated by using a volt meter 12 with ten decibels higher sensitivity. The increased sensitivity of the meter does not change its distortion characteristics but a minimum of ten decibels is always maintained between the meter and the circuit under measurement. This attenuator naturally reduces the reflected wave form distortion by the amount of its loss so that the distortion factor is decreased to the order of .90%. The resistances 20 and 21 are power type resistors of small capacity and the voltage developed across resistance 21 is adjusted in small steps by the use of the potentiometer 11. The combination of the fixed attenuator and the potential divider can be manufactured at a very low cost.

On the panel 10 concentric with the button 19 is arranged a fixed dial 24 on which are provided impedance indications in terms of ohms. Within the dial 24 is arranged a normally stationary but rotatable dial 25 provided with indications of the corrective factors required for adapting the device to the testing of different impedance circuits. The dial 25 is provided with an operating handle 26. The device is designed and calibrated for direct reading across a 500 ohm circuit element and when thus used, the zero point on the dial 25 is arranged opposite the 500 ohm indication on the dial 24. The button 19 is then rotated until the volt meter gives a zero reading and then the pointer 27 on the button 19 gives the correct decibel reading. When the device is used for the testing of a circuit having a different impedance, the dial 25 is rotated to bring the zero point opposite the proper ohm indication so that a direct reading may be obtained by observation of the number on the dial 25 to which the pointer 27 is directed. The necessary correction factor will appear opposite the 500 ohm indication, but regardless of the attenuator adjustment, the pointer 27 will indicate the correct value directly. In the event that volumes of impedance calibrations (not shown) are required, sufficiently accurate results may be obtained by interpolation or the system may be modified by the use of intermediate calibrations on both dials or on additional dials.

The meter 12 is pivotally supported at one end of a bar 28 slidably supported by a bracket 29 attached to the rear face of the panel 10. This arrangement makes it possible to pull out the meter from the position shown in Fig. 2 to the position shown in Fig. 3 and when thus pulled out, turn it to either of the locations indicated in dotted lines in Fig. 3. The meter is pivotally attached to the rod 28 by a pin 30 and is slidably mounted in a boss 31 having a threaded portion extending through the frame 29 and there is a nut 32 threaded onto the boss to attach it to the frame. The bar 28 is provided with a groove 33 into which projects a screw 34 to limit the outward movement of the meter.

The supporting arrangement for the meter permits it being placed in such position as to be clearly visible throughout the arc of 180°. The mechanical design is so arranged as to prevent the meter from tilting, tipping or twisting while permitting it to be turned through 180° about its vertical axis only.

The circuit arrangement herein described permits the use of a 5000 ohm potentiometer rather than the usual 5000 ohm L pad such as is disclosed in the proceedings of the Institute of Radio Engineers, volume 23, page 226, March, 1935. The cost of the apparatus is therefore materially decreased inasmuch as the 5000 ohm L pad is more expensive than a 5000 ohm potentiometer.

I claim:

1. A device of the character described comprising an attenuator having a series arm and a shunt arm forming a constant impedance L network, a potentiometer connected across said shunt arm with the first terminal of its winding connected between said arms, and a voltage meter having one terminal connected to the adjustable contact of said potentiometer and its other terminal connected to the second terminal of said potentiometer winding.

2. A device of the character described comprising an attenuator having a series arm and a shunt arm, a potentiometer bridged across said shunt arm with its first terminal connected between said series and shunt arms, a rotatable contact member for said potentiometer, a volt meter having one terminal connected to said contact member and its other terminal connected to the second terminal of said potentiometer winding, an operating handle for said contact, a fixed annular dial concentric with said operating member and having impedance calibrations thereon, an adjustable annular dial within said fixed dial, having correction factor indications thereon, and a pointer on said operating handle.

3. In combination, a panel having an aperture, a frame attached to one face of said panel across said aperture, a bar slidably supported by said frame for movement through said aperture, and a volt meter pivotally connected to said bar for movement therewith between a position in which said volt meter is arranged in said aperture flush with said panel and a position in which said volt meter is completely exterior of said aperture, and free for pivotal movement relative to said bar.

4. In combination, a panel having an aperture, a frame attached to one face of said panel across said aperture, a bar slidably supported by said frame for movement through said aperture, a volt meter pivotally connected to said bar for movement therewith between a position in which said volt meter is arranged in said aperture flush with said panel and a position in which said volt meter is completely exterior of said aperture and free for pivotal movement relative to said bar, and inter-engaging means on said frame and bar to limit movement of said bar and meter relative to said frame.

JOHN P. SMITH, Jr.